(12) United States Patent
Lee

(10) Patent No.: US 6,766,563 B2
(45) Date of Patent: Jul. 27, 2004

(54) HINGE ASSEMBLY FOR A DOOR OF KIMCHI STORAGE DEVICE

(75) Inventor: Young-gil Lee, Asan-shi (KR)

(73) Assignee: Mando Climate Control Corporation (KR)

( * ) Notice: Subject to any disclaimer, the term of this patent is extended or adjusted under 35 U.S.C. 154(b) by 89 days.

(21) Appl. No.: 10/154,161

(22) Filed: May 23, 2002

(65) Prior Publication Data

US 2003/0000955 A1 Jan. 2, 2003

(30) Foreign Application Priority Data

May 24, 2001 (KR) .......................................... 2001-28727
Jul. 26, 2001 (KR) .......................................... 2001-45165

(51) Int. Cl.[7] ................................................. E05F 1/08
(52) U.S. Cl. ............................ 16/286; 16/281; 16/290; 16/335
(58) Field of Search .......................... 16/286, 280, 281, 16/290, 335, 336, 330

(56) References Cited

U.S. PATENT DOCUMENTS

| | | | | |
|---|---|---|---|---|
| 1,094,153 A | * | 4/1914 | Krentler | 12/136 R |
| 3,927,439 A | * | 12/1975 | Gronbach | 16/290 |
| 4,461,548 A | * | 7/1984 | Drlik | 351/153 |
| 4,744,487 A | | 5/1988 | Welborn | |
| 4,884,316 A | * | 12/1989 | Masuda | 16/288 |
| 4,884,317 A | * | 12/1989 | Liu | 16/289 |
| 5,448,799 A | * | 9/1995 | Stein, Jr. | 16/225 |
| 5,515,575 A | * | 5/1996 | Pinazza | 16/228 |
| 5,630,459 A | * | 5/1997 | Martin | 160/236 |
| 6,393,664 B1 | * | 5/2002 | Habegger et al. | 16/335 |
| 6,415,477 B1 | * | 7/2002 | Hosaka et al. | 16/327 |
| 6,530,122 B1 | * | 3/2003 | Kondou et al. | 16/335 |

FOREIGN PATENT DOCUMENTS

| | | | |
|---|---|---|---|
| DE | 3201570 | | 7/1983 |
| FR | 2343210 A | * | 11/1977 |
| GB | 2338027 A | * | 12/1999 |
| JP | 200019267 A | * | 1/2000 |
| KR | 2002089803 A | * | 11/2002 |

* cited by examiner

Primary Examiner—Chuck Y. Mah
(74) Attorney, Agent, or Firm—Fish & Richardson P.C.

(57) ABSTRACT

A hinge assembly for a door of a kimchi storage device is disclosed. The hinge assembly has a support member 60 including a first contact surface 62a sloping down on the upper surface thereof and a second contact surface 62b sloping down thereon next to the first contact surface 62a and prevents the door 5 from coming off the upper surface of the body 6 of the kimchi storage device by maintaining the closed position of the door tightly and prevents cold air leakage by maintaining a sealed state. Also, in an embodiment of the present invention, a hinge housing 70 has a guard portion 71 formed at an upper end portion thereof, the guard portion 71 having an inwardly curved shape and being extended from the upper end of the hinge housing 70 toward inside of the turn member 20, thereby covering a gap formed in a conjunction area between the hinge housing 70 and the turn member 20.

3 Claims, 12 Drawing Sheets

(PRIOR ART)

HINGE ASSEMBLY FOR A DOOR OF KIMCHI STORAGE DEVICE

Pursuant to 35 U.S.C. 119(a)–(d) this application claims priority from Korean application no. 2001-28727, filed May 24, 2001 and Korean application no. 2001-45165, filed on Jul. 26, 2001.

BACKGROUND OF THE INVENTION

1. Field of the Invention

The present invention relates to a hinge assembly for a door of a kimchi storage device, and more particularly, to a hinge assembly for a door of a kimchi storage device, which prevents the door from coming off the upper surface of the body by maintaining the closed position without fail upon closure of the door and which prevents cold air from leaking by maintaining a sealed state.

2. Description of the Related Art

As is generally known, kimchi storage devices exclusively used for kimchi, which mature and preserve kimchi optimally by using the principles of a refrigeration are now commonly used.

The kimchi storage device is constituted in such a manner that it can mature kimchi adequately according to seasonal variation and a user's taste and then preserve the taste of the well-matured kimchi for a long time at a proper temperature.

While a general refrigerator is designed to have a door which opens and closes laterally, it is common that such a kimchi storage device is provided with an upper open/closed type door having a small overall size which is hingeably fixed to the upper surface of the body and is moved longitudinally into and out of the open position.

As illustrated therein, two separate kimchi storage chambers 3 are provided in the body 6 of the kimchi storage device which forms the appearance. Two doors 5 are hinged to the upper end of the rear surface of the body 6 in order to open and close these two kimchi storage chambers 3 by lifting them upwardly.

All operations of the kimchi storage device are performed with a control panel 7 provided on the front surface of the body 6.

As illustrated in FIG. 3, a hinge assembly 10, which is employed for a conventional kimchi storage device 1, comprises a turn member 20 fixed to a door 5 side, a hinge housing 30 forming a compartment in a case shape, a roller-shaped press roll 21 disposed at one end of the turn member 20, a hexahedral support member 40 and a pair of spring members 50, both being placed in the compartment of the hinge housing 30, a support plate 31, an adjust plate 32, and a cover plate 33 fixed to a body 6 of the kimchi storage device 1.

The turn member 20 and the hinge housing 30 are rotatably connected by a hinge shaft 25, and an open internal region of the hinge housing 30 is covered by the cover plate 33.

The support member 40 has a sloping contact surface 41 on the upper surface thereof to enable a sliding motion by rolling contact with the press roll 21 and two spring coupling recesses 42 on the lower surface thereof for receiving the pair of spring members 50, which are below the sloping contact surface 41.

At this time, it is preferable that a buffer member 34 made of sponge material be inserted between the springs members 50 and the cover plate 33 for preventing direct frictional contact.

FIG. 4 is a cross sectional view of a partial portion of a kimchi storage device employing a hinge assembly in the conventional art. The turn member 20 is fixed and mounted to the rear surface of the door 5 by a screw assembly. The hinge housing 30 is fixed and mounted on the upper end of the rear surface of the body 6 by a screw assembly through the cover plate 33 which covers an open surface of the hinge housing 30 with an engagement means such as fixing protrudes of the hinge housing 30 and fixing holes of the cover plate 33.

In this way, in the state that the turn member 20 and hinge housing 30 of the hinge assembly are assembled, the turn member 20 fixed to the door 5 is turned over backwardly and moved when opening the door 5. When the door 5 is fully open, the turn member 20 is turned over at an angle of up to 90 degrees with respect to the upper end of the body 6.

At this time, the turn member 20 is slidably moved while the press roll 21 is in rolling contact with the slopping contact surface 41 having a slopping shape formed at the top surface of the support member 40.

When the door 5 is brought to the fully open position, the press roll 21 is in contact with the low contact surface 43 of the sloping contact surface 41, and gradually slides onto the high contact surface 44 of the sloping contact surface 41 as the door 5 is closed. Due to the sloping shape of the sloping contact surface 41, the press roll 21 presses the support member 40 downwardly and thus the spring member 50 contacted with the support member 40 is compressed by pressing force from the door 5 through the press roll 21.

As the door 5 comes closer to the closed position, the pressing force applied to the spring member 50 through the support member 40 becomes larger and accordingly the springback force of the spring member 50 also becomes larger.

Therefore, as the door 5 is closed, the resistance force caused by the springback force of the spring member 50 becomes larger. By the time the door 5 comes into contact with the body 6, the closing speed of the door 5 is sharply decreased to thus reduce the closing impact of the door 5.

However, in a case of the hinge assembly 10 employed for the kimchi storage device in the conventional art, the sloping contact surface 41 formed at the top surface of the support member 40 is simply configured to have a predetermined slope angle in the same direction between the low contact surface 43 and the high contact surface 44. Thus, when the door 5 is completely closed, the resistance force caused by the springback force of the spring member 50 is maximized thereby causing the upward pushing force on the support member 40 to be maximized.

Hence, when the door 5 is in the fully closed position, the springback force of the spring member 50 pushes the support member 40 upwardly and thus the press roll 21 contacting the high contact surface 44 of the sloping contact surface 41 returns to the low contact surface 43, though slightly. This generates an inadequate gap as the door 5 comes off from the upper surface of the body 6 thereby allowing a cold air to leak out from the kimchi storage chamber 3 through the gap between the door 5 and the body 6.

Furthermore, when the door 5 of the kimchi storage device 1 is opened, the turn member 20 fixed to the door 5 is turned over backwardly on a hinge shaft 25 with respect to the fixed hinge housing 30. At this time, there may occur an incidental accident such as a pinching of a user's fingers in the gap of a joint portion between the lower end portion of the turn member 20 and the upper end portion of the hinge housing 30, the magnitude of the gap varying according to the opening and closing angles of the door 5.

SUMMARY OF THE INVENTION

It is, therefore, an object of the present invention to provide a hinge assembly for a door of a kimchi storage device which prevents the door from coming off the upper surface of the body by maintaining the closed position of the door tightly and which prevents cold air leaking from the kimchi storage chamber by maintaining a sealed state between the door and the body.

It is another object of the present invention to provide a hinge assembly for a door of a kimchi storage device which prevents a pinching of a user's finger in the gap between a hinge housing and a turn member during opening and closing of the door and thusly enabling safe opening and closing operations.

To achieve the above object, there is provided a hinge assembly for a door of a kimchi storage device according to the present invention, comprising: A hinge assembly for a door of a kimchi storage device, comprising: a turn member fixed to the door; a hinge housing having a compartment in a form of a case; a roller-shaped press roll disposed at one end of the turn member; a hexahedral support member and a pair of spring members, both being placed in the compartment of the hinge housing; and a cover plate fixed to a body of the kimchi storage device, wherein the support member includes a first contact surface and a second contact surface, both of which are formed on the upper surface thereof, the first contact surface sloping down toward a front side of the hinge housing and being in rolling contact with the press roll during an opening process and while the door is in an open position and, the second contact surface sloping down toward a back side of the hinge housing, being next to the first contact surface and being in rolling contact with the press roll during a closing process and while the door is in a closed position.

In an embodiment of the present invention, the hinge housing has a guard portion formed at an upper end portion thereof, the guard portion having an inwardly curved shape and being extended from the upper end of the hinge housing toward inside of the turn member, thereby covering a gap formed in a conjunction area between the hinge housing and the turn member.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
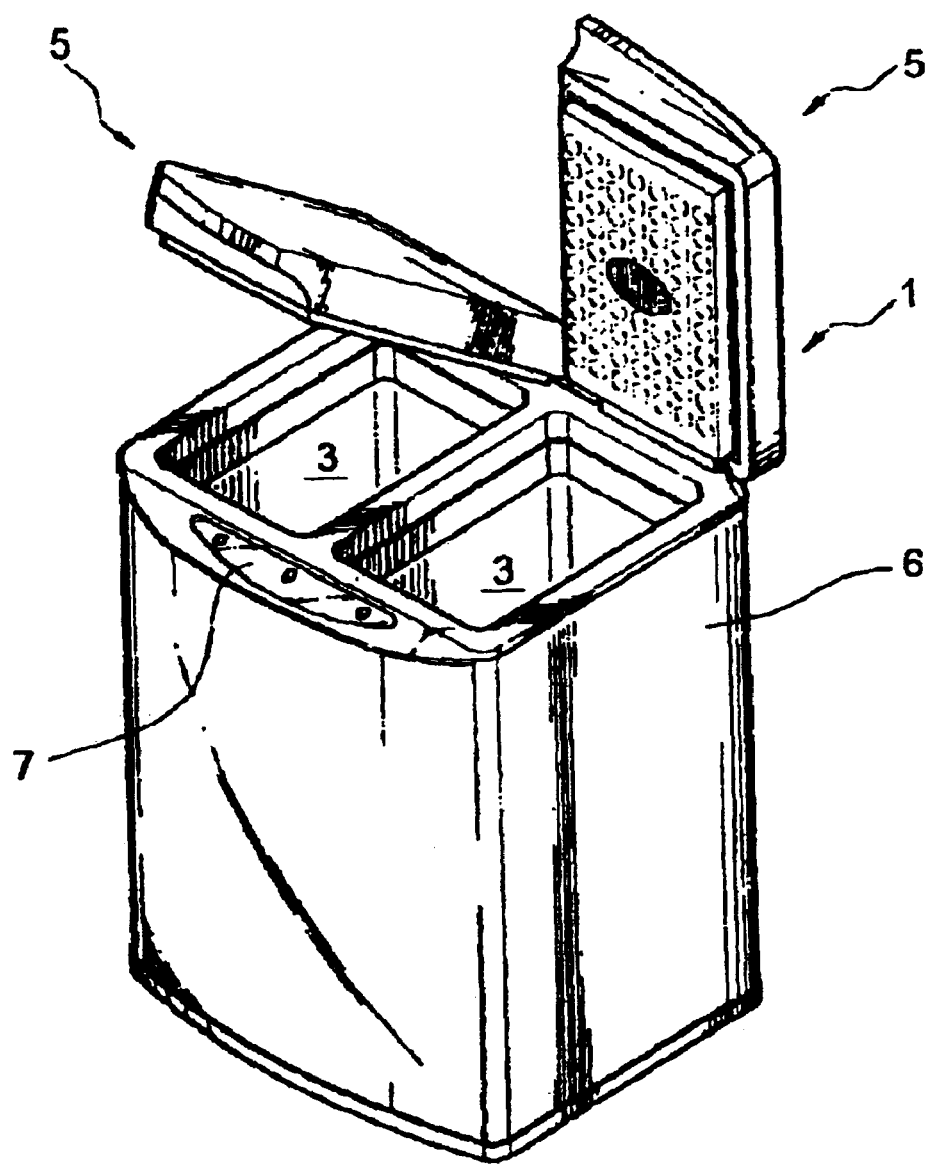
FIG. 1 is a front perspective view of a conventional kimchi storage device.
Figure 2:
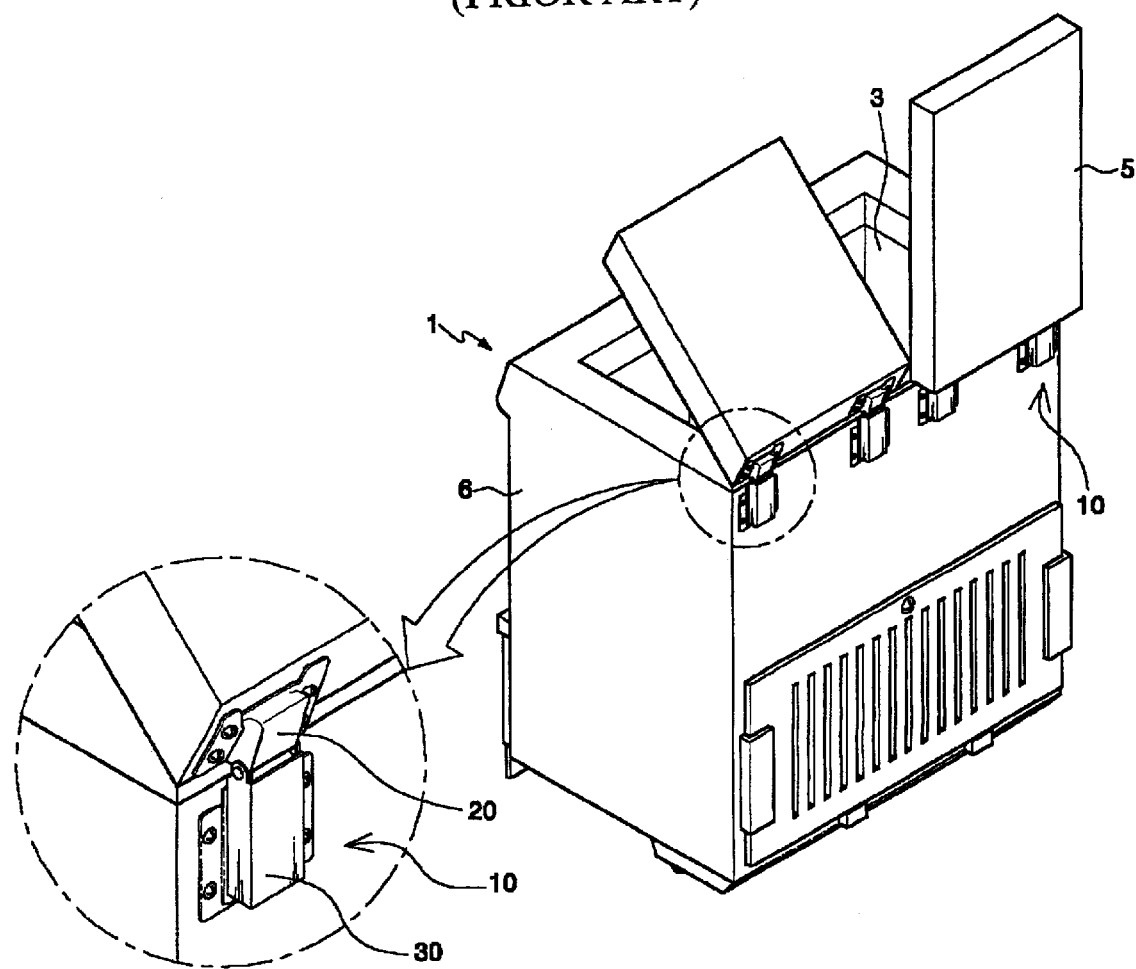
FIG. 2 is a rear perspective view of the conventional kimchi storage device.
Figure 3:
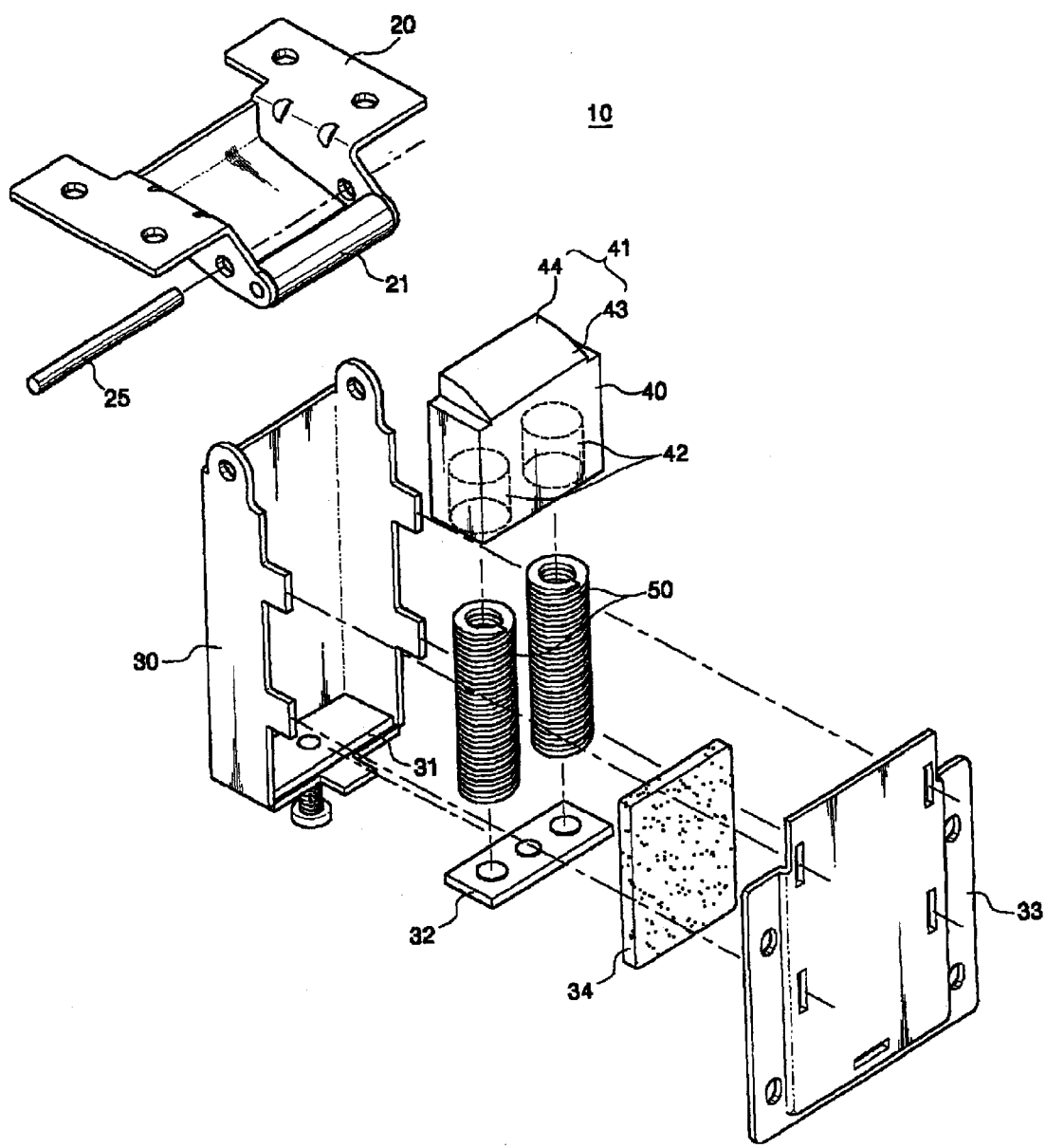
FIG. 3 is an exploded perspective view showing a hinge assembly of the conventional kimchi storage device.
Figure 4:
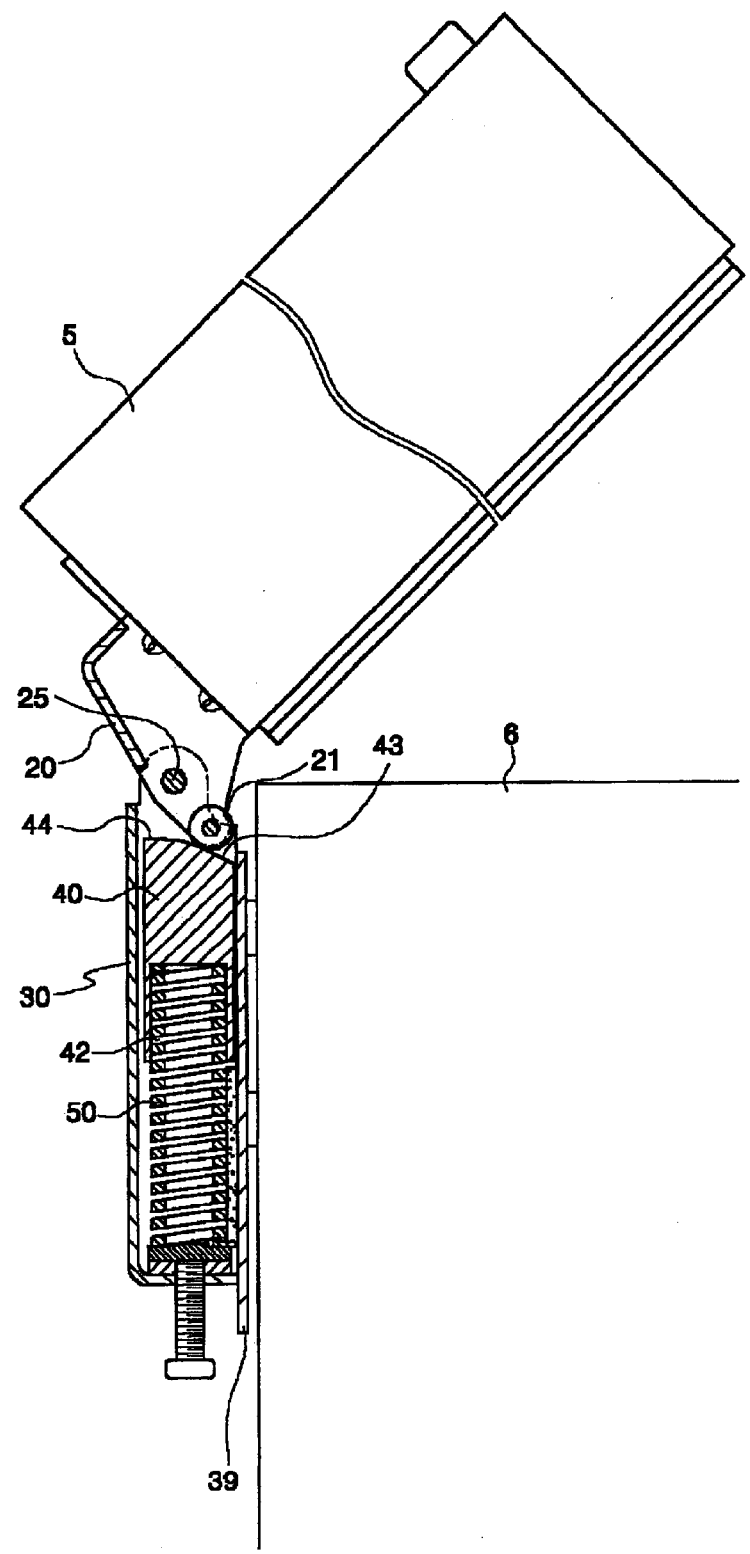
FIG. 4 is a side cross-sectional view of a kimchi storage device employing a conventional hinge assembly.

Preferred embodiments of the present invention will now be described with references to the accompanying drawings.

In the following description, same drawing reference numerals as the conventional art are used for the same elements and a detailed description thereof will be omitted.

Figure 5:
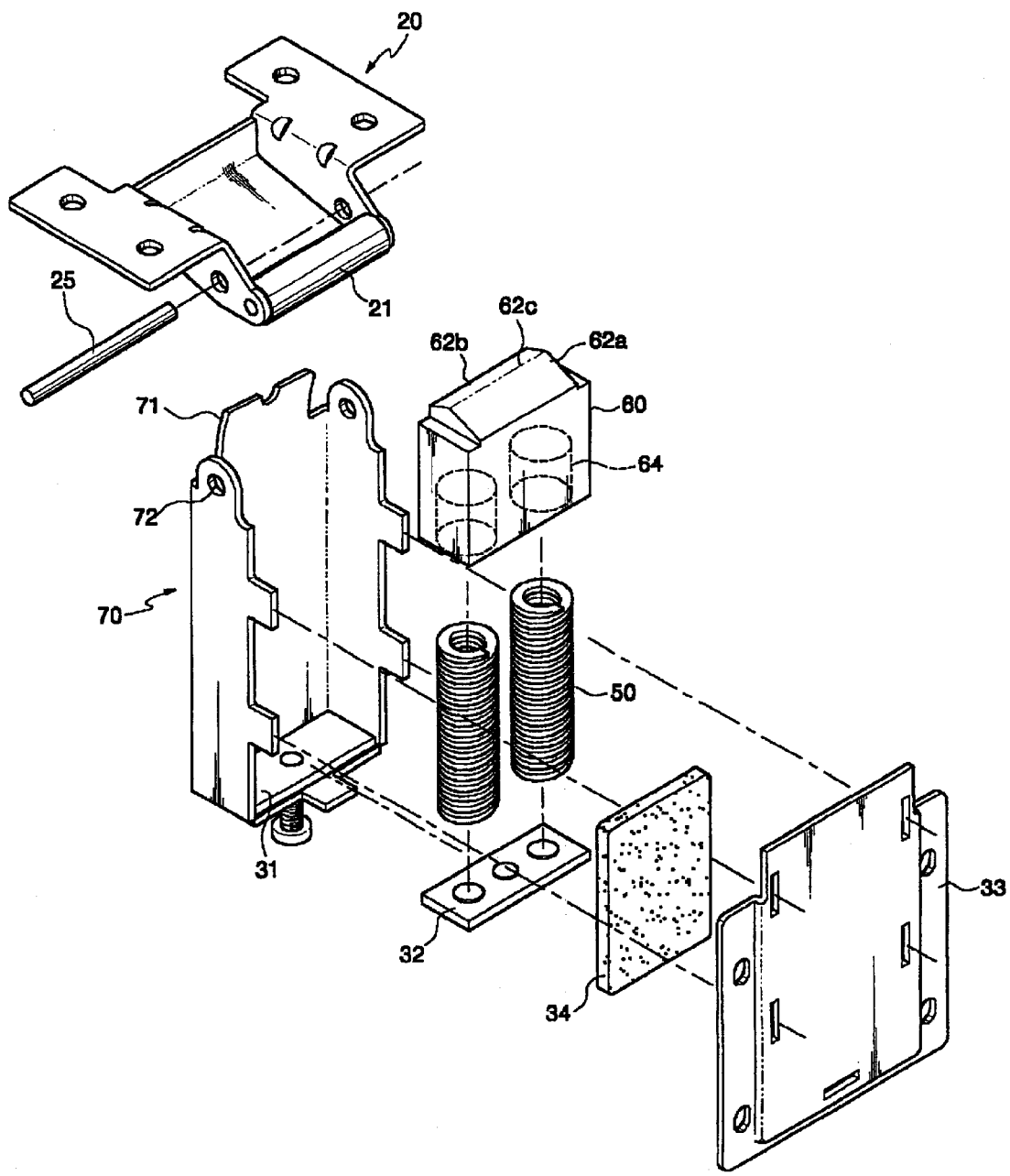
FIG. 5 is an exploded perspective view showing a hinge assembly according to the present invention.
Figure 6:
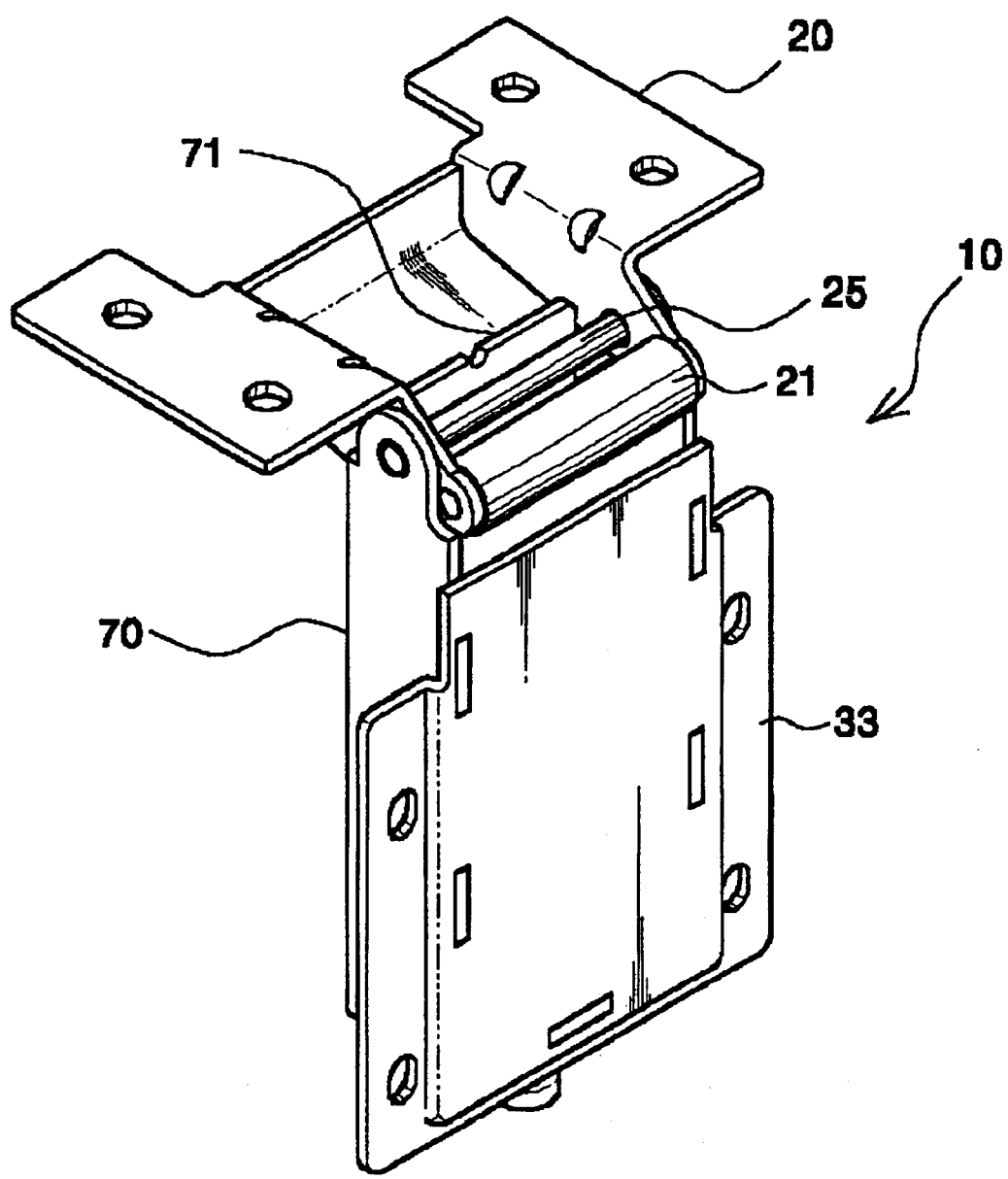
FIG. 6 is a perspective view of the hinge assembly according to the present invention.
Figure 7:
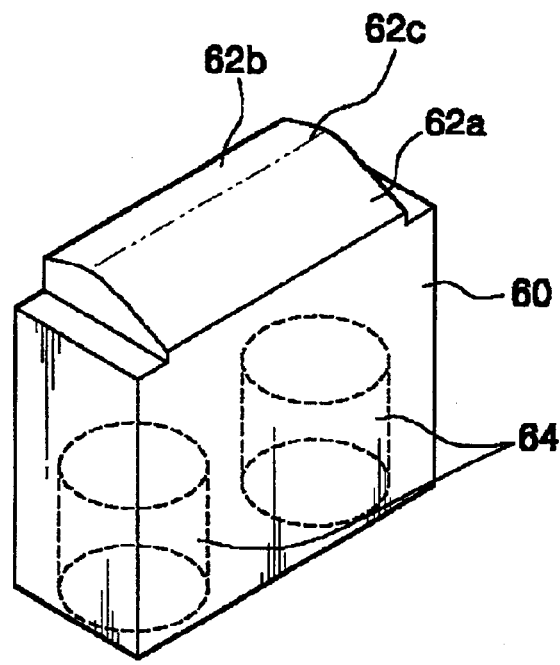
FIG. 7 is a perspective view showing a support member according to the present invention.
Figure 8:
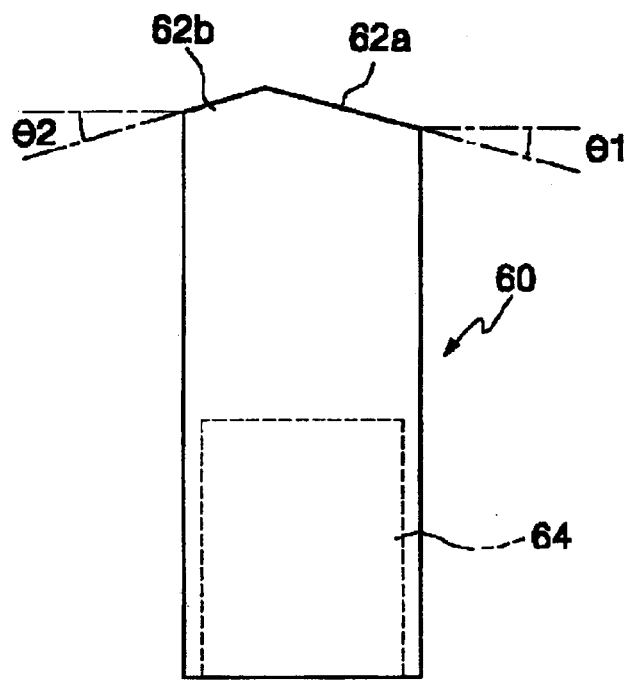
FIG. 8 is a side view of the support member according to the present invention.

FIG. 5 is an exploded perspective view showing a hinge assembly according to the present invention; FIG. 6 is a perspective view of the hinge assembly according to the present invention; FIG. 7 is a perspective view showing a support member according to the present invention; and FIG. 8 is a side view of the support member according to the present invention.

As illustrated in the drawings, on the upper surface of the support member 60 of the hinge assembly 10 are formed a first contact surface 62a having an angle with a positively increased gradient and a second contact surface 62b having an angle with a negatively decreased gradient, and on the lower surface thereof are formed two spring coupling recesses 64 for receiving an upper end portion of a pair of spring members 50 and containing them respectively.

The first contact surface 62a has a predetermined positive slope angle and is of an upwardly sloping shape as it goes in a backward direction on the upper surface of the support member 60. In this invention, backward direction consists of going from a cover plate 33 to a hinge housing 70.

At this time, in this embodiment, the first contact surface 62a has a slope angle $\theta_1$ of about 10 to 20 degrees.

The second contact surface 62b is formed at a rear portion of the upper surface of the support member 60, being next to the first contact surface 62a. It has a predetermined negative slope angle and is of a downwardly sloping shape.

Also, like the first contact surface 62a, the second contact surface 62b has a slope angle $\theta_2$ of about 10 to 20 degrees.

Thus, at an area where the first contact surface 62a and the second contact surface 62b meet, there is formed an edge portion 62c of an angular shape.

Preferably, the first contact surface 62a and the second contact surface 62b have a length ratio of 3:1 with respect to a horizontal line on the upper face of the support member 60.

At the hinge assembly 10 according to the present invention, a guard portion 71 is formed at an upper end portion of the hinge housing 70. The guard portion having an inwardly curved shape is extended from the upper end of the hinge housing 70 toward inside of the turn member 20 to cover a gap formed in a conjunction area between the hinge housing 70 and the turn member 20.

The hinge housing 70 has two lateral faces and a backward face having the guard portion 71. At the front end of both lateral faces is formed a protuberance having a shaft hole 72 for coupling the turn member 20 and the hinge shaft 25.

As mentioned above, the guard portion 71 is formed by an extension of the upper end portion of the backward face of the hinge housing 70. The guard portion 71 has an inwardly curved shape so that it can extend toward the turn member 20 and be placed therein.

At this time, the guard portion 71 has such a shape and degree of curving that it cannot contact the hinge shaft 25 and the press roll 21 within the turn member 20.

The operation and effects of the present invention will now be described.

Figure 9:
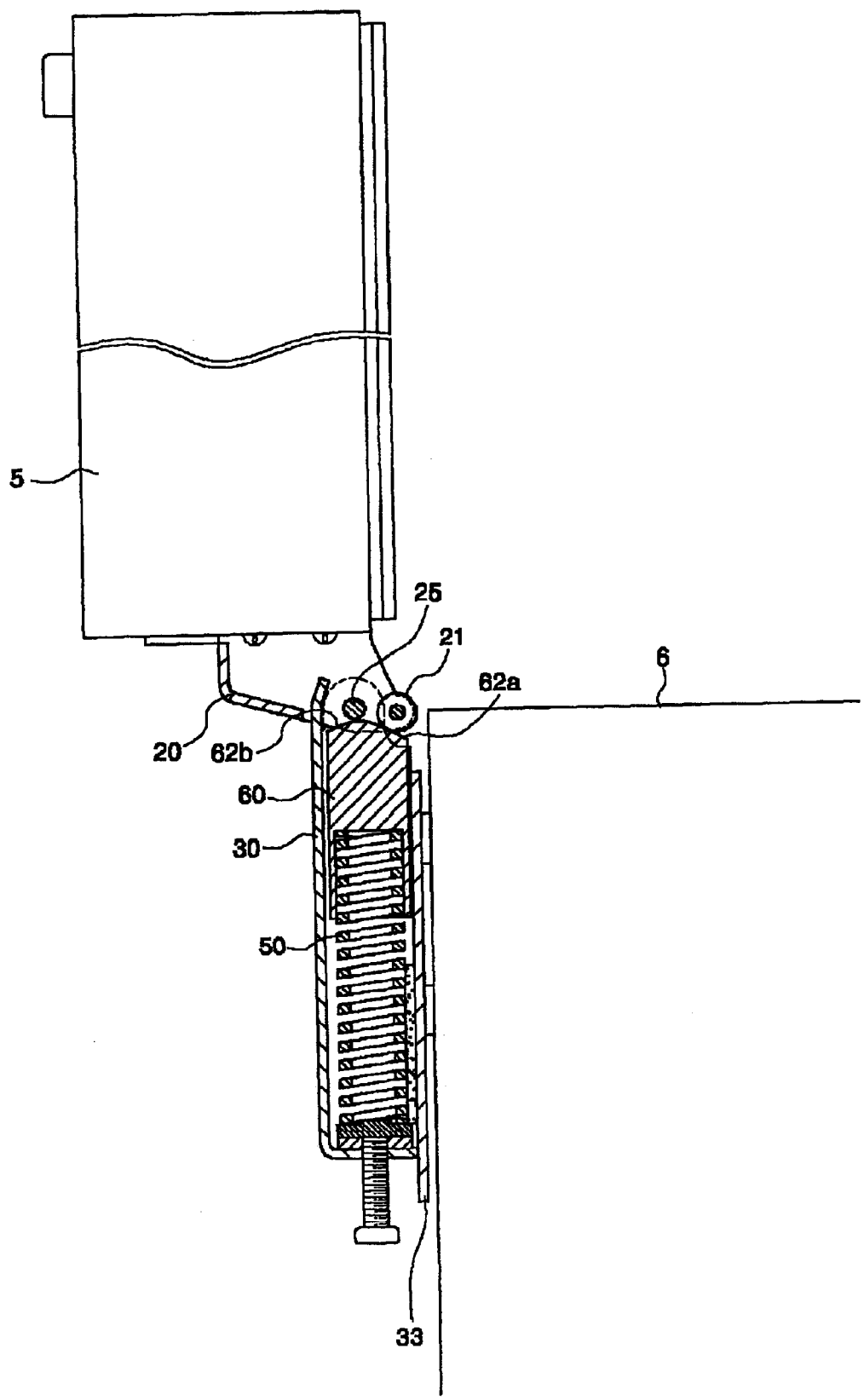
FIGS. 9 to 11 are side cross-sectional views showing the operation of a door of a kimchi storage device employing the hinge assembly according to the present invention.
Figure 10:
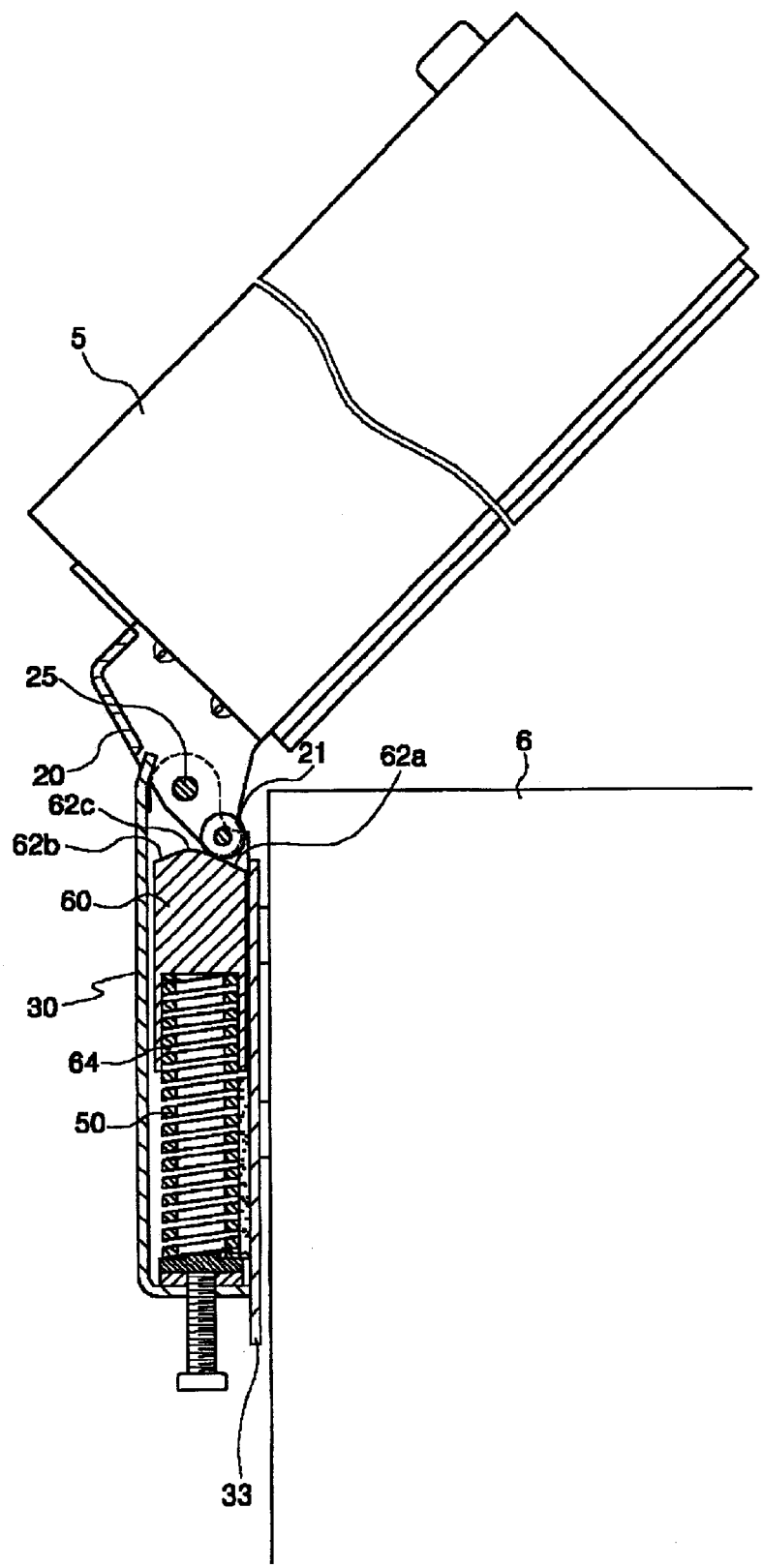
Figure 11:
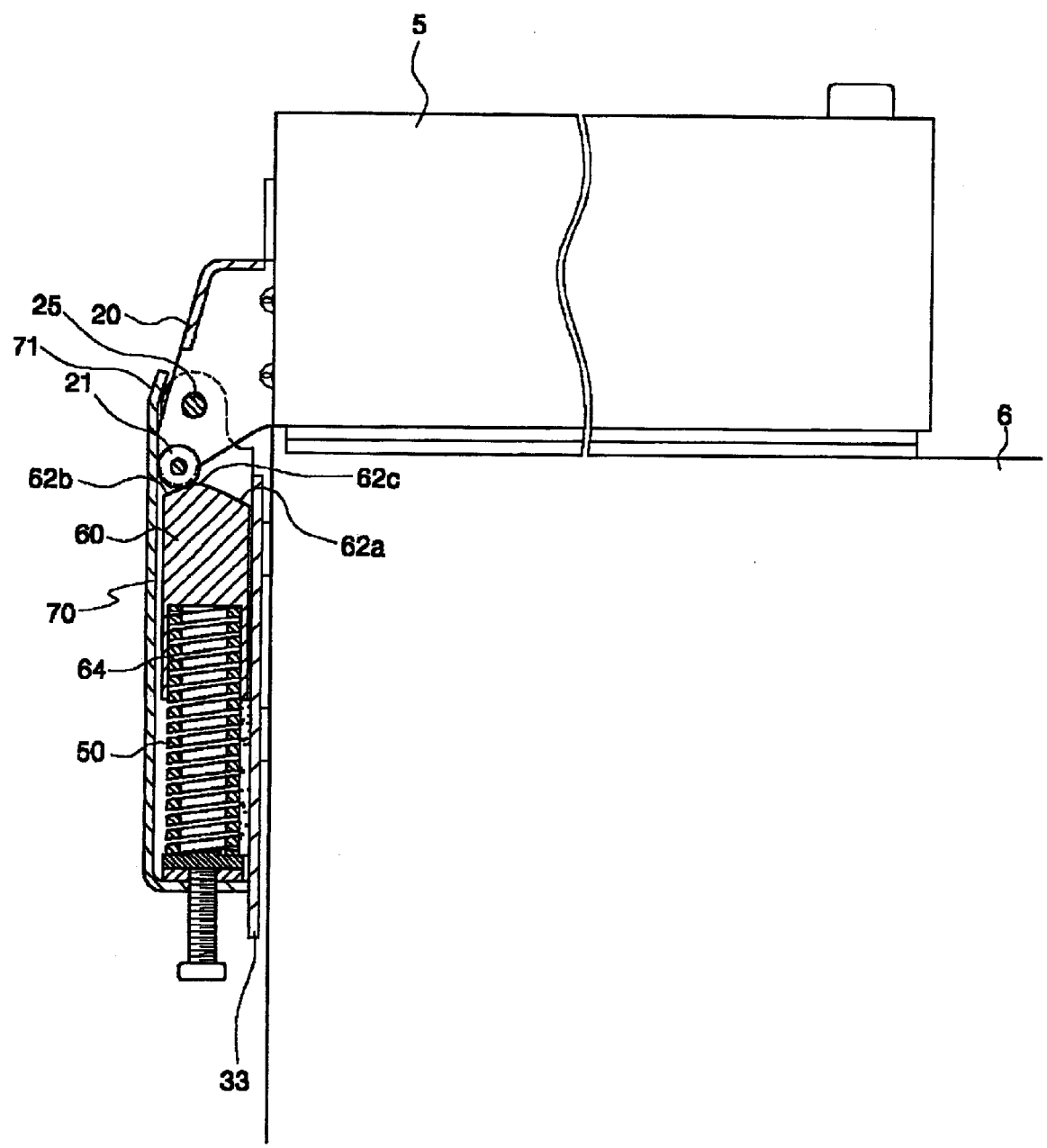
Figure 12:
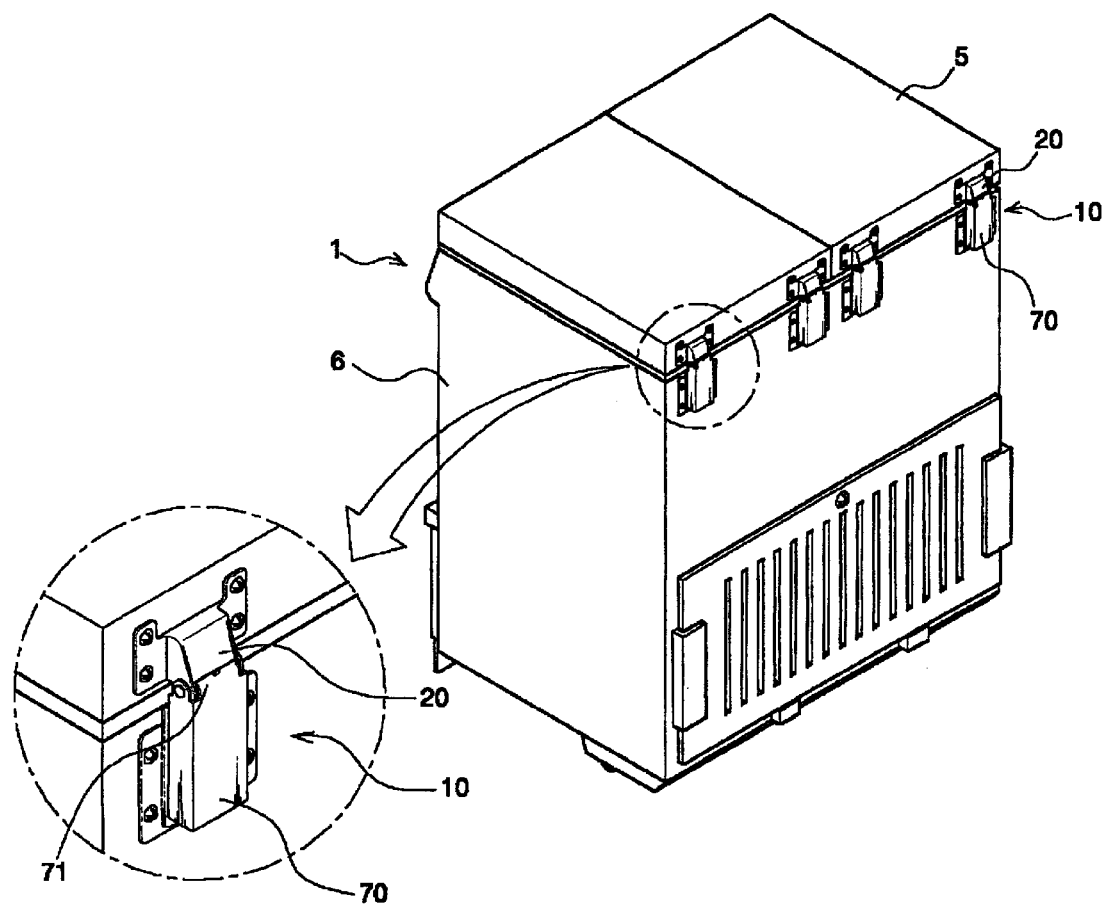
FIG. 12 is a rear perspective view of the kimchi storage device employing the hinge assembly according to the present invention.
Figure 13:
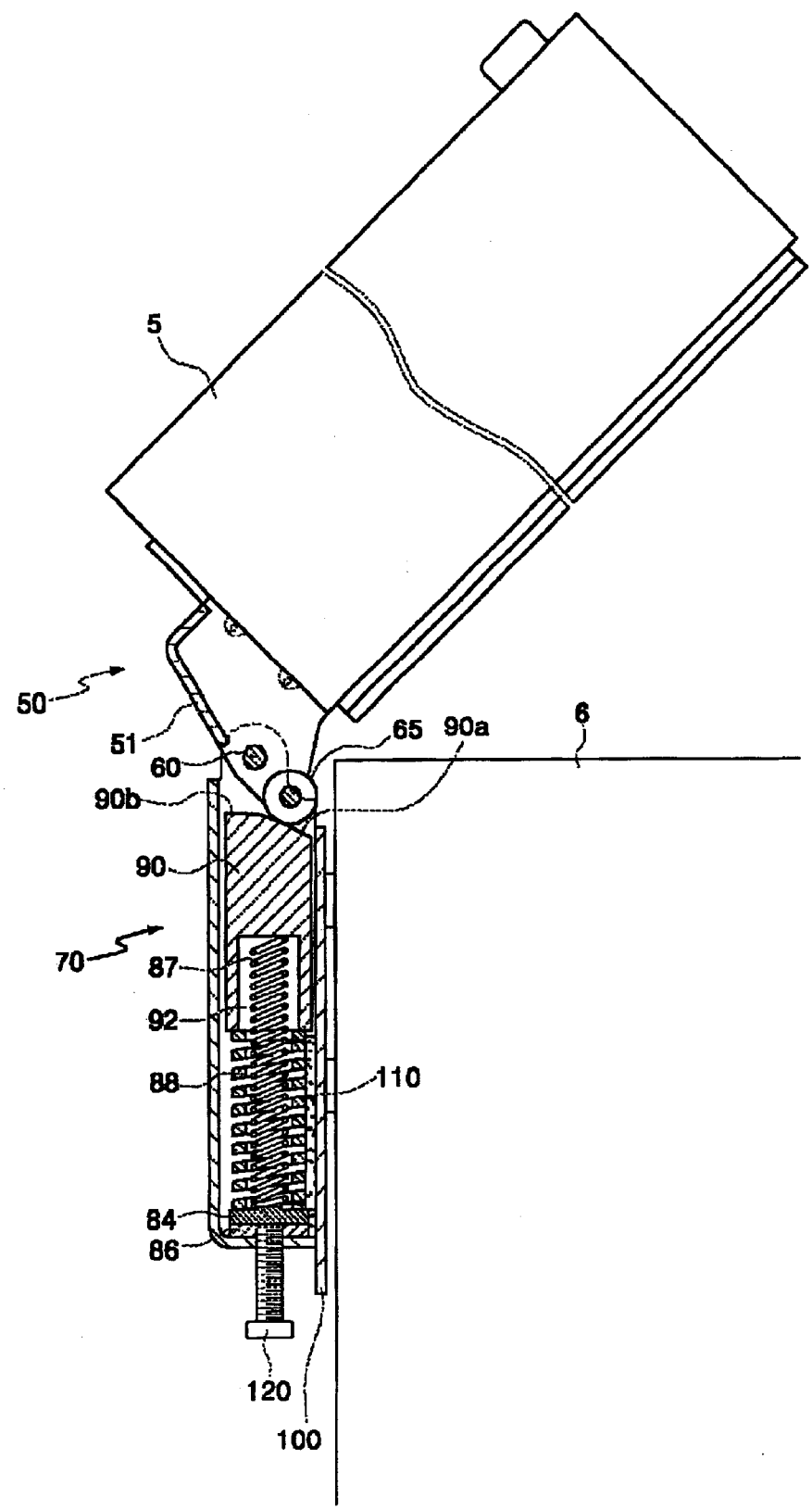
FIG. 13 is a partial cutaway plane view of the storage device including a hinge assembly.

FIGS. 9 to 11 are side cross-sectional views showing the operating state of a door of a kimchi storage device employing the hinge assembly according to the present invention.

As mentioned above, according to the construction of the support member of the present invention, on the upper surface of the support member 60 are formed the first contact surface 62a of a upwardly sloping shape and the second contact surface 62b of a downwardly sloping shape next to the first contact surface 62a.

The thusly constructed support member 60 contains parts of one end of a spring member 50 with a springback force and is placed in the compartment of the hinge housing 70.

On the upper surface of the support member 60 consisting of the first contact surface 62a and the second contact surface 62b comes into contact with a roller-shaped press roll 21 being coupled to the front end of the turn member 20.

In such a construction, as illustrated in FIG. 9, when the door 5 is fully opened, the press roll 21 comes into contact with the front portion of the first contact surface 62a.

Also, as illustrated in FIG. 10, as the door 5 is closed, the press roll 21 is slidably moved along the first contact surface 62a of the upwardly sloping shape. Due to the sloping shape, the press roll 21 presses the support member 60 downwardly and thus the spring member 50 connected with the support member 60 is compressed by the pressing force from the door 5 through the press roll 21.

As the door 5 comes closer to the closed position, the press roll 21 reaches closer to the edge portion 62c along the first contact surface 62a. At this time, the compression force reserved in the spring member 50 by the door 5 becomes larger and accordingly the springback force of the spring member 50 becomes larger.

As illustrated in FIG. 11, when the door 5 is fully closed, the press roll 21 goes over the edge portion62c into the second contact surface 62b and away from the first contact surface 62a.

At this time, since the second contact surface 62b is of a downwardly sloping shape, the compression force on the spring member 50 becomes alleviated and accordingly the springback force of the spring member 50 also becomes alleviated.

The edge portion 62c, which is formed at the area where the first and second contact surfaces 62a and 62b meet, prevents the press roll 21 on the second contact surface 62b from returning to the first contact surface 62a without an external force.

Therefore, the edge portion 62c serves an important role in maintaining the closed position of the door.

Furthermore, since the guard portion71 of an inwardly curved shape, being extended from the upper end of the backward face of the hinge housing 70 toward inside of the turn member 20 and is placed therein, the turn member 20 fixed to the door 5 is turned over backwardly when a user lifts the door 5 upwardly in order to open a storage chamber.

At this time, the guard portion 71 formed at the front end of the hinge housing 70 goes into the turn member 20 and covers the gap formed in the conjunction area between the hinge housing 70 and the turn member 20, thus preventing incidental accident such as the pinching of the user's finger. Also, because the guard portion 71 is in a curved shape, the turn member 20 can turn around without interfering with the guard portion 71.

As mentioned above, according to the construction of the support member of the hinge assembly for the door of the kimchi storage device of the present invention, the closing speed of the door is alleviated by the springback force of the spring upon closure of the door, thus preventing the closing impact of the door. Also, when the door is closed by the second contact surface, formed at the rear portion of the upper surface of the support member, the closed position can be maintained without fail, thus preventing the door from coming off the upper surface of the body and preventing cold air leakage by maintaining a sealed state.

Moreover, by covering the gap formed in the conjunction area between the hinge housing and the turn member with the guard portion formed at the upper end of the hinge housing covers, incidental accident such as a pinching of the user's finger can be prevented during opening and closing of the door, thus enabling safe opening and closing operations.

What is claimed is:

1. A hinge assembly for a door of a kimchi storage device, comprising:

a turn member fixed to the door;

a hinge housing having a compartment;

a roller-shaped press roll disposed at one end of the turn member;

a hexahedral support member and a pair of spring members, both being placed in the compartment of the hinge housing; and a cover plate fixed to a body of the kimchi storage device, wherein the support member includes a first contact surface and a second contact surface, both of which are formed on the upper surface thereof, the first contact surface sloping down toward a front side of the hinge housing and being in rolling contact with the press roll during an opening process and when the door is in an open position and, the second contact surface sloping down toward a back side of the hinge housing, being next to the first contact surface and being in rolling contact with the press roll during a closing process and when the door is in a closed position.

2. A hinge assembly for a door of a kimchi storage device, comprising;

a turn member fixed to the door;

a hinge housing having a compartment;

a roller-shaped press roll disposed at one end of the turn member;

a hexahedral support member and a pair of spring members, both being placed in the compartment of the hinge housing; and a cover elate fixed to a body of the kimchi storage device, wherein the support member includes a first contact surface and a second contact surface, both of which are formed on the upper surface thereof, the first contact surface sloping down toward a front side of the hinge housing and being in rolling contact with the press roll during an opening process and when the door is in an open position and, the second contact surface sloping down toward a back side of the hinge housing, being next to the first contact surface and being in rolling contact with the press roll during a closing process and when the door is in a closed position, wherein the first and second contact surfaces have a slope angle of about 10 to 20 degrees respectively and a length ratio of the first and second contact surfaces is 3:1.

3. A hinge assembly for a door of a kimchi storage device, comprising:
- a turn member fixed to the door;
- a hinge housing having a compartment;
- a roller-shaped press roll disposed at one end of the turn member;
- a hexahedral support member and a pair of spring members, both being placed in the compartment of the hinge housing; and
- a cover plate fixed to a body of the kimchi storage device;
- wherein the support member includes a first contact surface and a second contact surface, both of which are formed on the upper surface thereof, the first contact surface sloping down toward a front side of the hinge housing and being in rolling contact with the press roll during an opening process and when the door is in an open position and, the second contact surface sloping down toward a back side of the hinge housing, being next to the first contact surface and being in rolling contact with the press roll during a closing process and when the door is in a closed position, wherein the hinge housing has a guard portion formed at an upper end portion thereof, the guard portion having an inwardly curved shape and is extended from the upper end of the hinge housing toward inside of the turn member, thereby covering a gap formed in a conjunction area between the hinge housing and the turn member.

* * * * *